Feb. 14, 1939.   H. LIST ET AL   2,147,381
GENERATION OF EXTREMELY LARGE SHORT-DURATION ENERGY IMPULSES
Filed May 19, 1936   2 Sheets-Sheet 1
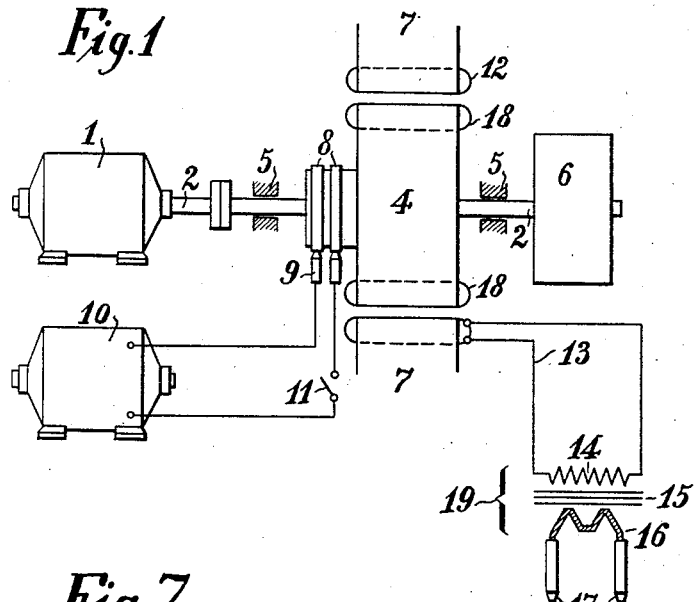
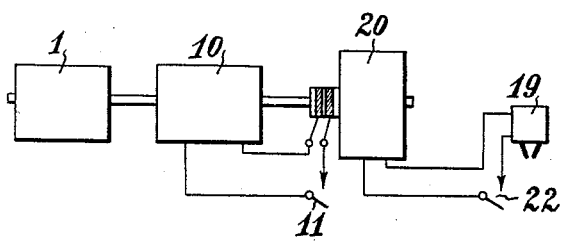
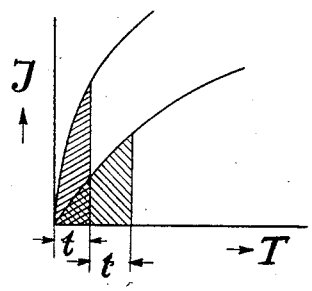
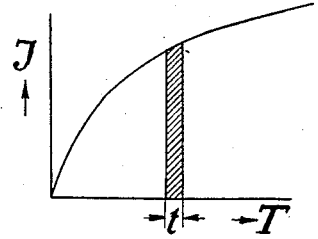
INVENTORS:
HEINRICH LIST
GERHARD HAGEDORN
BY Haseltine Lake & Co.
ATTORNEYS Feb. 14, 1939.  H. LIST ET AL  2,147,381
GENERATION OF EXTREMELY LARGE SHORT-DURATION ENERGY IMPULSES
Filed May 19, 1936  2 Sheets-Sheet 2
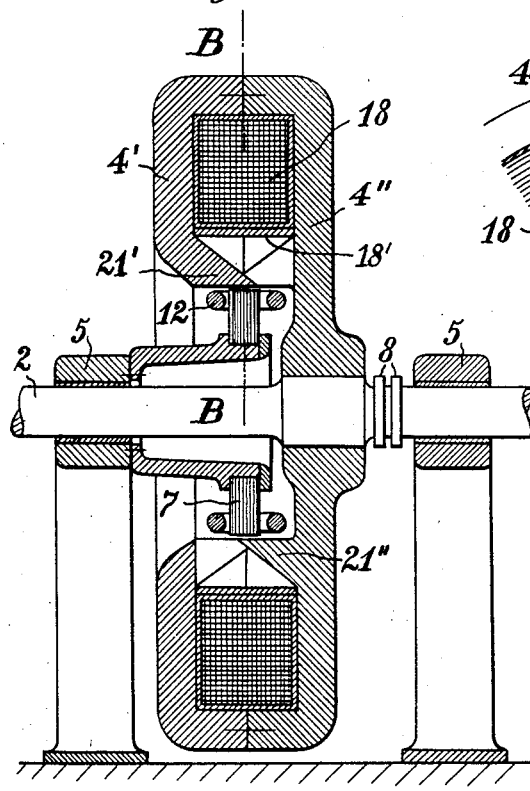
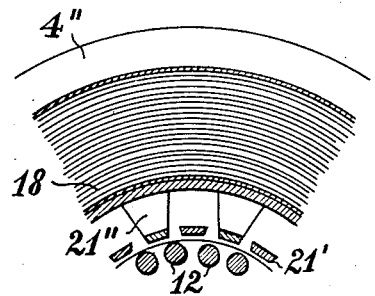
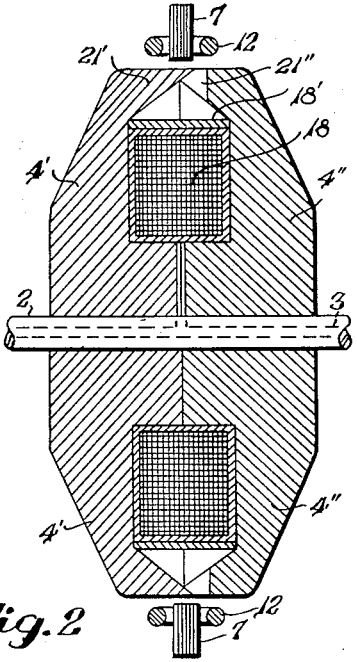
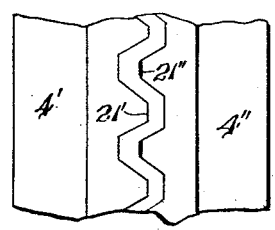
INVENTORS:
HEINRICH LIST
GERHARD HAGEDORN
BY Haseltine Lake & Co.
ATTORNEYS Patented Feb. 14, 1939

2,147,381

UNITED STATES PATENT OFFICE 2,147,381

GENERATION OF EXTREMELY LARGE SHORT-DURATION ENERGY IMPULSES

Heinrich List, Berlin-Lankwitz, and Gerhard Hagedorn, Berlin-Halensee, Germany, assignors to Vertriebs-Gesellschaft des Leipziger Leichtmetall-Werk m. b. H., Berlin, Germany, a firm of Germany Application May 19, 1936, Serial No. 80,640
In Germany July 11, 1933

9 Claims. (Cl. 171—252)

In the generation of extremely large short duration energy impulses particularly suitable for use in welding it has been proposed to use an apparatus comprising a so-called medium or high frequency alternator i. e. an alternator whose frequency is higher than the usual mains frequency which may be for example from 60 to 100,000 cycles, the alternator field being moreover strongly over-excited and the mechanical energy stored in the rotating mass of the alternator being converted into extremely high shortduration energy impulses. The speed of rotation of the rotating mass and the field excitation are adjustable while the exciting current and the alternating current output of the current generator is limited by means of time switches or other means. The energy impulses for the momentary excitation of the alternator can if desired be derived from the rotational energy.

The present invention concerns an improvement or extension of the described apparatus for the production of extremely high short duration current impulses.

According to the invention the rotor of the intermediate or high frequency current generator is so constructed that the exciting winding is enclosed by claw-like intercalated or overlapping pole-teeth and the iron cross-section of the rotating field opposite the stator increases sharply towards the tooth root and the pole teeth are intercalated only to a slight extent, while the stator carrying the alternating current winding is narrow by comparison with the width of the rotor and corresponds more or less to the width over which the successive pole teeth overlap or are intercalated. Preferably the stator does not undergo the said width over which the successive pole teeth are intercalated and does not exceed the distance between the roots of the pole teeth. The stator consists for example of a narrow ring of iron stampings.

The rotor is in this case preferably assembled in two halves which enclose a ring shaped space for the exciting winding which is abnormally large and is held in place by a ring of nonmagnetic material, the pole-teeth tapering towards the outer periphery of the rotor enclosing the exciting winding in a claw-like manner. The over-all thickness of the iron stampings forming the stator is preferably maintained smaller than the spacing between the tooth roots of the two rotor halves. The number of the teeth and also the number of poles can be made very high. The rotor comprises preferably by comparison with its diameter and its effective electrical length a large inertia so that it can serve at the same time as a flywheel.

High frequency alternating current generators have been proposed, for example, for radio telegraphy, which are provided with toothed rotors. These are capable of providing a high frequency alternating current but are not suitable for extremely high short duration energy impulses because the momentum is too small and because the field is not over excited.

The impulse loading of the rotor is less and involves a smaller reduction of speed the greater is the flywheel effect of the rotor. The latter increases with the mass of the rotor and with the square of its radius of inertia. For the purpose of the invention a so-called claw-pole machine is most suitable. The invention can, however, also be applied to normal alternating pole machines or homo-polar machines.

In a particular embodiment of the invention the rotating part or rotor of the medium or high frequency alternator is so constructed that is surrounds the fixed part or stator. In this way the flywheel effect of the rotor is increased. In this case the outer rotating part preferably carries the magnet poles or teeth and the exciting winding. It is however also possible to arrange the part carrying the alternating current winding to rotate.

If in the case of an external rotating field the iron cross section of the rotor be maintained constant then the rotor mass will increase linearly with increasing radius of inertia. The flywheel effect will, however, increase with the third power of the diameter. Since, however, the cross-section of the rotor iron compared with internal rotating field can be reduced without reduction in output and with increasing diameter the weight of iron can be approximately maintained. The flywheel effect is, however, increased with the square of the ratio of the diameters. For the same output and the same weight a considerably larger flywheel effect can be obtained with the external rotating field generator so that the provision of an additional flywheel is unnecessary.

In a further form of the invention an exciting machine is provided for the excitation of the rotor of the alternator and this further permits the rate of growth of the exciting current to be varied.

Further control of the output energy can be obtained by including in addition to the switch (preferably adjustable as to its timing) which is provided between the exciting current source and the exciting winding of the rotor a further switch in the intermediate or high frequency current circuit i. e. between the alternator and the transformer.

The switch in the medium or high frequency current circuit is preferably in this case made dependent as regards its operation upon the switch arranged between the exciting source, for example the exciting machine, and the exciting winding of the rotor, and in such manner that first the switch in the exciting circuit and then the switch in the primary circuit of the transformer is closed and after the required time the switch in the exciting circuit is again opened.

In the following several embodiments of the apparatus in accordance with the invention will be described by way of example with reference to the drawings.

Figure 1 shows schematically the general arrangement;

Figure 2 is a section through the rotor and the stator of the alternator in the arrangement in accordance with the invention;

Figure 3 is a plan view of an unwound part of the periphery of the rotor;

Figure 4 is a section through another embodiment of the alternator;

Figure 5 is a part section on the line B—B in Figure 4;

Figure 6 is a graphical representation which shows the growth of current in two cases;

Figure 7 shows schematically the connection diagram in a modified embodiment of the invention;

Figure 8 is a graphical representation which shows the growth of current in the embodiment in accordance with Figure 7.

Referring to Figure 1, the driving motor is indicated at 1 and is coupled to the shaft 2 of a medium or high frequency alternating current generator having a rotor 4. The shaft 2 is carried in bearings 5 and is provided with an additional flywheel 6. The shaft 2 is divided between the motor 1 and the rotor 4 the two portions thereof being connected by means of a coupling. The rotor 4 may be constructed in different ways as will be more fully explained hereinafter. In particular it may be constructed as a toothed rotor whose exciting winding may consist of individual pole or zig-zag winding. The stator 7 which surrounds the rotor 4 comprises slots in which is wound an alternating current winding 12. The exciting current is conducted to the exciting winding 18 on the rotor 4 through slip-rings 8 and brushes 9 from an exciting machine 10. In the exciting current circuit is a switch 11 which may for example be a time-controlled switch. The medium or high frequency current induced in the stator of the alternator is led by means of conductor 13 to the primary winding 14 of a medium or high frequency transformer 19 having an iron core 15. From the secondary winding 16 the transformed current is then led, if the arrangement is used, for example, for resistance welding to electrodes 17.

The exciting winding 18 is very much larger than usual i. e. the field winding is much larger than in a normal alternating current generator of like size and like frequency in order that the strong reaction on the part of the loaded stator 7, which effects a de-excitation and considerable neutralisation of the field between the poles of the rotor 4, may be counteracted in spite of the fact that considerable fields are forced through the stator iron.

In carrying out the invention the cross-section of the air gap between the rotor and stator is, with a view to a reduction of demagnetisation, made as small as possible and the flux density as large as possible. The rotor 4 is, for example, so constructed that the exciting winding 18 is enclosed by claw-like intercalated pole teeth 21' and 21" which with a view to keeping the demagnetisation at a minimum are only intercalated i. e. only over-lap to a slight extent. The tips of the teeth 21', 21" have only a very small cross section while the cross section of the iron at the roots of the teeth increases rapidly relatively to the increase in the magnetic flux. The rotor 4 in this construction comprises two disc-shaped halves 4', 4" which are keyed on the shaft 2 (which is bored out at 3 for the leads to the energising winding 18) the arrangement being such as to leave a sufficiently wide annular space for the energising winding 18. The exciting winding 18 is held in place by means of a band 18' of non-magnetic material (Figure 2).

The rotor 4 is surrounded by the stator 7 having a stator winding 12, as shown in Figure 2. The stator 7 is built up from iron stampings and its breadth is preferably less than the distance between the roots of the teeth of the two rotor halves 4', 4" (Figure 3).

In addition to the large cross sectional dimensions of the iron core of the rotor 4 for the purpose of obtaining a small magnetic reluctance a considerable rotating mass is provided in the rotor so that the loading impulses occurring with short-duration extremely large current impulses are taken up by the rotational energy of the rotor which acts as a flywheel and a specially provided flywheel is in certain cases entirely unnecessary.

In Figure 4 the embodiment of medium or high frequency alternating current generator shown therein is constructed as an external rotating field machine. In this case also the abnormally large energising winding 18 is enclosed by a claw-like intercalated pole-teeth. The two rotor-halves 4' and 4" are preferably bolted together while one of the halves is keyed on the shaft 2. The rotor may, however, be built up from more than two parts if desired. The abnormally large energising winding 18 is again energised through slip rings 8 from an exciting machine or the like. The halves 4' and 4" of the rotating field system carry on the inner peripheries the teeth 21' and 21" whose cross section, as in the other embodiment rapidly increases from tooth-tip to tooth-root and the greatest possible distance from one another is maintained and they are only slightly intercalated.

The stator 7 which is built up from stamping is arranged inside the rotor on a hub or the like which for example may be fixed to the bearing 5 of the medium or high frequency alternating current generator. The stator 7 carries the alternating current winding 12 as will be apparent from Figure 5.

From Figure 1 it is apparent that the duration of the excitation of the medium or high frequency current generator is dependent upon the duration of contact of the switch 11 which may be constructed at a time switch. The time switch 11 as is known permits of only one adjustment for different durations of contact. With this switch, however, merely a limitation of the excitation within the required short time may be obtained. In carrying out the invention the amount as well as the effective duration of the excitation is made variable by variation of the growth of current with time in the rotor so that having regard to the application of the apparatus, for example the characteristics of the welding material, a variation of the time with maintenance or variation of the amount of energy applied to the welding material can be obtained. The variation of the growth of current with time can be obtained by adjustment of the voltage of the exciting machine. With an increase in the voltage a more rapid current growth is obtained as is apparent from Figure 6.

In the embodiment according to Figure 7 there is employed in addition to the above mentioned time switch 11 between the exciting machine 10 and the exciting winding 18 in the rotor 4 a switch 22 in the connection to the transformer 19.

The switch 22 is made dependent as regards its operation upon the switch 11 in such a way that as a result of co-operation of the two switches the energy output, for example for the welding process, is fixed. From Figure 8 it is apparent that in this case in addition to the variation in time and the current growth with time there is also obtained a displacement of the working point on the characteristic.

By closing the switch 11 the excitation of the rotor 4 of the generator commences according to the current-growth curve of Figure 8, without energy output to the transformer 19 taking place because the switch 22 is still open. After a period to be chosen at will in dependence upon the application of the apparatus the switch 22 is closed so that the transformer 19 receives a current impulse whose time duration is limited by switching off, for example, the switch 11. By reason of this displacement of the working point a second increase of the amount of energy within the limited allowable time is rendered possible accompanied if desired, by a shortening of the effective duration.

Further the switch which must operate under very heavy load conditions is used only for a switching on, which is effected without difficulty, and not for switching off so that it can be made of particularly simple construction.

Whereas in the apparatus for the generation of extremely large short-duration energy impulses according to the present invention frequencies higher than the usual commercial frequency of 60 cycles up to 100,000 cycles may be used, it is preferred to employ frequencies of 200–300 cycles to 10,000 cycles.

Having now fully described our invention, we claim:—

1. In apparatus for the generation of extremely large short duration energy impulses for welding and like purposes, an alternating current generator comprising a rotating field system, an exciting winding for said field system, said field system consisting of a rotor having claw-like overlapping pole-teeth enclosing said exciting winding which is so dimensioned as to strongly over-excite said field system, and a stator carrying an alternating current winding, the core of said stator being narrow by comparison with said rotor and substantially equaling in width at least the overlap of the successive pole-teeth of the rotor, said pole teeth increasing rapidly in cross section from the tooth-tips next the stator towards the tooth-roots.

2. In apparatus for the generation of extremely large short duration energy impulses for welding and like purposes, an alternating current generator comprising a rotating field system, an exciting winding for said field system, said field system consisting of a rotor built up from two disc-shaped halves provided with a comparatively large space for the said exciting winding having claw-like overlapping pole-teeth enclosing said exciting winding which is so dimensioned as to strongly over-excite said field system, and a stator carrying an alternating current winding, the core of said stator being narrow by comparison with said rotor and substantially equaling in width at least the overlap of the successive pole-teeth of the rotor, said pole teeth increasing rapidly in cross section from the tooth-tips next the stator towards the tooth roots.

3. In apparatus for the generation of extremely large short duration energy impulses for welding and like purposes, an alternating current generator comprising a rotating field system, an exciting winding for said field system, said field system consisting of a rotor built up from two disc-shaped halves having claw-like overlapping pole-teeth enclosing said exciting winding which is so dimensioned as to strongly over-excite said field system, a band of non-magnetic material retaining said winding in place, and a stator carrying an alternating current winding, the core of said stator being narrow by comparison with said rotor and substantially equaling in width at least the overlap of the successive pole-teeth of the rotor, said pole teeth increasing rapidly in cross section from the tooth tips next the stator towards the tooth roots.

4. In apparatus for the generation of extremely large short duration energy impulses for welding and like purposes, an alternating current generator comprising a rotating field system, an exciting winding for said field system, said field system consisting of a rotor having claw-like overlapping pole-teeth enclosing said exciting winding which is so dimensioned as to strongly over-excite said field system, and a stator built up from iron laminae carrying an alternating current winding, the core of said stator being narrow by comparison with said rotor and substantially equaling in width at least the overlap of the successive pole-teeth of the rotor, said pole teeth increasing rapidly in cross section from the tooth tips next the stator towards the tooth roots.

5. In apparatus for the generation of extremely large short duration energy impulses for welding and like purposes, an alternating current generator comprising a rotating field system, an exciting winding for said field system, said field system consisting of a rotor built up from two disc-shaped halves having claw-like overlapping pole-teeth enclosing said exciting winding which is so dimensioned as to strongly over-excite said field system, and a stator carrying an alternating current winding, the core of said stator being made narrower than the distance between the roots of the teeth of the two rotor halves, said pole teeth increasing rapidly in cross section from the tooth tips next the stator towards the tooth roots.

6. In apparatus for the generation of extremely large short duration energy impulses for welding and like purposes, an alternating current generator comprising a rotating field system, an exciting winding for said field system, said field system consisting of a rotor having claw-like overlapping pole-teeth enclosing said exciting winding which is so dimensioned as to strongly over-excite said field system, and a stator carrying an alternating current winding, the core of said stator being narrow by comparison with said rotor and substantially equaling in width at least the overlap of the successive pole-teeth of the rotor, said rotor having in relation to its diameter and its effective length a large mass of iron so that it serves as a fly-wheel, said pole-teeth increasing rapidly in cross section from the tooth tips next the stator towards the tooth roots.

7. In apparatus for the generation of extremely large short duration energy impulses for welding and like purposes, an alternating current generator comprising a rotating field system, an exciting winding for said field system, said field system consisting of a rotor built up from two disc-shaped halves having claw-like overlapping pole-teeth enclosing said exciting winding which is so dimensioned as to strongly over-excite said field system, a band of non-magnetic material retaining said winding in place, and a stator carrying an alternating current winding, the core of said stator being narrow by comparison with said rotor and substantially equaling in width at least the overlap of the successive pole-teeth of the rotor, said rotor having in relation to its diameter and its effective length a large mass of iron so that it serves as a fly-wheel, said pole-teeth increasing rapidly in cross section from the tooth tips next the stator towards the tooth roots.

8. In an apparatus for the generation of extremely large short duration energy impulses for welding and like purposes, an alternating current generator comprising a rotating field system, an exciting winding for said field system, said field system consisting of a rotor built up from two disc-shaped halves having claw-like overlapping pole teeth enclosing said exciting winding which is so dimensioned as to strongly over-excite said field system, and a stator carrying an alternating current winding, the core of said stator being narrow by comparison with said rotor and substantially equaling at least the overlap of the successive pole teeth of the rotor, the rotor being external to and surrounding the stator.

9. In an apparatus for the generation of extremely large short duration energy impulses for welding and like purposes, an alternating current generator comprising a stationary field system, an exciting winding for said field system, said field system comprising a stator having claw-like overlapping pole teeth enclosing said exciting winding which is so dimensioned as to strongly over-excite said field system, and a rotor carrying an alternating current winding, the core of said rotor being built up from iron laminae and being narrow by comparison with said stator and substantially equaling at least the overlap of the successive pole teeth of the stator, the stator being external to and surrounding the rotor.

HEINRICH LIST.
GERHARD HAGEDORN.